United States Patent
Suchak

(10) Patent No.: US 9,895,659 B2
(45) Date of Patent: Feb. 20, 2018

(54) METHODS FOR REMOVING CONTAMINANTS FROM EXHAUST GASES

(71) Applicant: Naresh J. Suchak, Glen Rock, NJ (US)

(72) Inventor: Naresh J. Suchak, Glen Rock, NJ (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/535,978

(22) Filed: Nov. 7, 2014

(65) Prior Publication Data
US 2016/0082389 A1    Mar. 24, 2016

Related U.S. Application Data

(60) Provisional application No. 62/054,562, filed on Sep. 24, 2014.

(51) Int. Cl.
| | | |
|---|---|---|
| *B01D 53/75* | (2006.01) | |
| *B01D 53/60* | (2006.01) | |
| *B01D 53/56* | (2006.01) | |
| *B01D 53/50* | (2006.01) | |
| *B01D 53/38* | (2006.01) | |
| *B01D 53/40* | (2006.01) | |
| *B01D 53/64* | (2006.01) | |

(52) U.S. Cl.
CPC ............ *B01D 53/75* (2013.01); *B01D 53/38* (2013.01); *B01D 53/40* (2013.01); *B01D 53/505* (2013.01); *B01D 53/508* (2013.01); *B01D 53/56* (2013.01); *B01D 53/565* (2013.01); *B01D 53/60* (2013.01); *B01D 53/64* (2013.01); *B01D 2251/104* (2013.01); *B01D 2251/304* (2013.01); *B01D 2251/402* (2013.01); *B01D 2251/404* (2013.01); *B01D 2257/302* (2013.01); *B01D 2257/404* (2013.01); *B01D 2257/602* (2013.01); *B01D 2258/01* (2013.01); *B01D 2258/025* (2013.01); *B01D 2258/0233* (2013.01); *B01D 2258/0283* (2013.01)

(58) Field of Classification Search
None
See application file for complete search history.

(56) References Cited

U.S. PATENT DOCUMENTS

| | | | |
|---|---|---|---|
| 5,206,002 A | 4/1993 | Skelley et al. | |
| 5,985,223 A | 11/1999 | Saxena et al. | |
| 6,162,409 A * | 12/2000 | Skelley | B01D 53/60 |
| | | | 423/235 |
| 6,649,132 B1 | 11/2003 | Hwang et al. | |
| 7,303,735 B2 * | 12/2007 | Suchak | B01D 53/50 |
| | | | 423/210 |

(Continued)

FOREIGN PATENT DOCUMENTS

PL    188482    *  2/2005

*Primary Examiner* — Melvin C Mayes
*Assistant Examiner* — Sheng H Davis
(74) *Attorney, Agent, or Firm* — David A. Hey, Esq.

(57) ABSTRACT

Industrial gas streams such as flue gas streams are treated for nitrogen oxides and other contaminants in dry or semi-dry scrubbers. After the flue gas stream has been contacted with a sorbent, ozone is mixed downstream into the flue gas stream thereby oxidizing the nitrogen oxides and other contaminants. The oxidized contaminants is contacted with sorbent present in the gas stream in the remaining height or volume of the scrubber downstream of ozone injection; and The sorbent is then separated from the flue gas stream leaving the dry or semi-dry scrubber.

15 Claims, 1 Drawing Sheet

(56) References Cited

U.S. PATENT DOCUMENTS

| | | | |
|---|---|---|---|
| 8,865,098 B2 | 10/2014 | Suchak | |
| 8,871,166 B2 | 10/2014 | Suchak | |
| 2003/0154858 A1* | 8/2003 | Kleut | B01D 53/04 95/133 |
| 2005/0008555 A1* | 1/2005 | Hsieh | B01D 53/56 423/235 |
| 2013/0276835 A1* | 10/2013 | Jepsen | C04B 18/08 134/19 |
| 2014/0127107 A1* | 5/2014 | Suchak | F23J 15/04 423/235 |
| 2015/0044116 A1* | 2/2015 | Suchak | F01N 3/04 423/235 |

\* cited by examiner

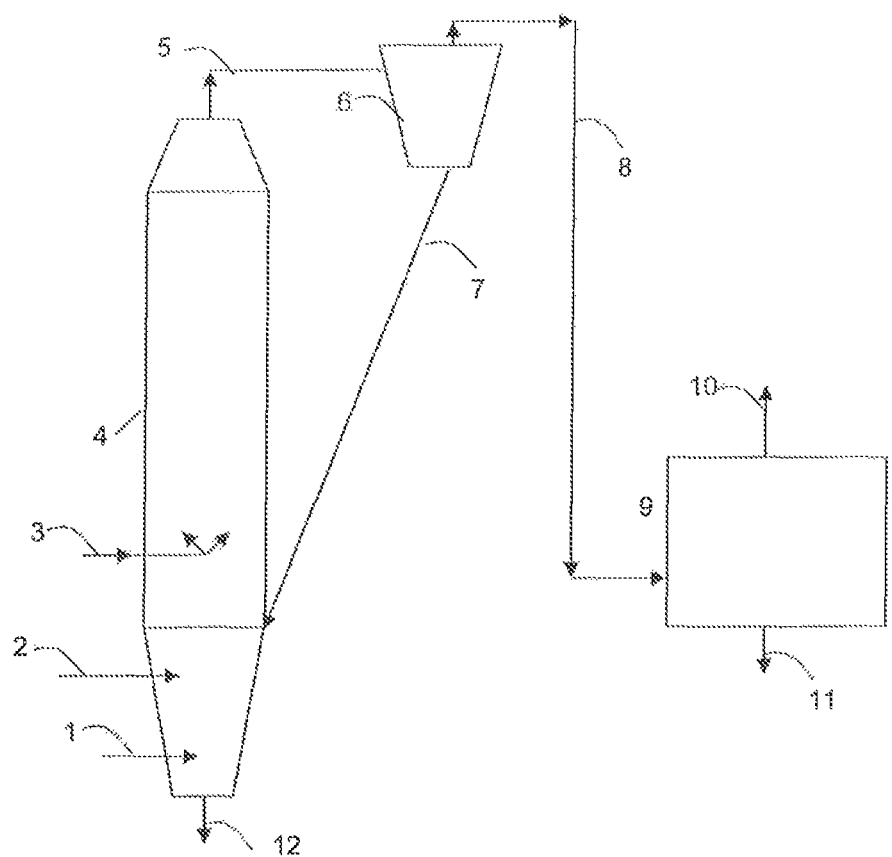

METHODS FOR REMOVING CONTAMINANTS FROM EXHAUST GASES

CROSS REFERENCE TO RELATED APPLICATIONS

The present application claims priority from U.S. provisional application 62/054,562 filed Sep. 24, 2014.

BACKGROUND OF THE INVENTION

The invention provides for methods for removing contaminants selected from the group consisting of nitrogen oxides, sulfur oxides, particulates, heavy metals and acid gases from gas streams.

More particularly, the invention provides for nitrogen oxides oxidation within a semi-dry scrubbing vessel without affecting the removal efficiencies for other contaminants at lower ozone consumption and further causing no issues of residual ozone or corrosion to downstream metallurgy of the semi-dry scrubber.

Semi-dry scrubbing has gained considerable success in lowering emissions from industrial gas exhaust systems such as those from metal roasting furnaces, sintering and pelletizing processes, lime and cement kilns where cleaning the exhaust stream in a wet scrubber is not a preferred option.

Nitrogen oxides from industrial sources mainly consist of NO which is not soluble and non-reactive. Nitrogen oxides are not removed in a dry or semi-dry scrubbing apparatus by commonly sued sorbents in the industry.

The methods of this invention uses the chemistry and techniques for oxidizing nitrogen oxides with ozone as described in U.S. Pat. Nos. 5,206,002; 6,162,409; 6,649,132; and 7,303,735 as well as US patent application publication 20140127107 in a dry or semi-dry scrubber.

Combustion and chemical processes generally result in gas streams containing contaminants that need to be cleaned up before the gas stream is exhausted to the atmosphere.

Many industrial processes, power generating utilities, combustion sources, stationary and mobile sources such as engines, boilers, kilns use solid fuels or low cost hydrocarbon fuels that contain sulfur, chlorine, nitrogen, and metal compounds in hydrocarbons which results in exhaust gases with contaminants such as acid gases, particulate matter and heavy metals. To comply with stricter environmental rules mandated by legislation, combinations of scrubbing (wet or dry) and particulate capture devices such as electrostatic precipitators (ESPs), wet ESPs and bag houses are increasingly preferred for emissions control of acid gas and particulate matters.

Some industrial segments prefer dry or semi-dry scrubbing. The most common semi-dry scrubbers for sulfur oxides ($SO_x$) and acid gases are of two types. The first type uses scrubbing of contaminants by large size sorbent aggregates being contacted in the very turbulent zone of the scrubber vessel. Contaminants come into contact with the large aggregates and are adsorbed on the surface. Aggregates that are carried with the gas stream are separated and recycled and may be partly purged. The rejuvenation of the aggregates is done in the scrubber vessel itself or in the aggregates recycle stream.

The second type of semi-dry scrubber uses atomized or very small size aqueous spray of lime slurry in the scrubber vessel. It is often named a spray dryer. Successful scrubbers often employ atomized lime spray and exhaust gas flow in a co-current fashion.

Mercury may also be removed from the flue gas stream to be treated by the injection of sorbents such as activated carbon.

The temperature of the exhaust streams entering into the dry or semi-dry scrubbers are often in excess of 325° F. (162.7° C.). Injecting ozone upstream of the semi-dry scrubber causes significant loss of performance due to a variety of reasons. Both ozone and the oxidized form of nitrogen oxides are very unstable at a temperature that is in excess of 325° F. (162.7° C.). The excess use of ozone can compensate for the decomposition of both ozone and oxidized nitrogen oxides can be costly and the excess ozone can have unintended consequences in adsorbing other contaminants on the sorbent.

Injecting ozone downstream of a semi-dry scrubber is a better option than injecting ozone upstream of the scrubber. The temperature of the exhaust stream exiting the semi-dry scrubber is moderate enough for ozone to oxidize nitrogen oxides effectively and most of the contaminants have already been removed in the semi-dry scrubber leaving ozone little or no role to play in adversely affecting removal efficiencies.

In order to meet high removal efficiencies, substantial amounts of nitrogen oxides must be in the pentavalent form to react with sorbent in the gas stream leaving the semi-dry scrubber vessel. The reactions that lead nitrogen oxides oxidation to pentavalent form are many and the chemistry is complicated but for the sake of brevity they are simplified as:

$$NO + O_3 \rightarrow NO_2 + O_2 \text{(very fast)} \qquad (1)$$

$$NO_2 + O_3 \rightarrow NO_3 + O_2 \text{(slow)} \qquad (2)$$

$$NO_2 + NO_3 \rightarrow N_2O_5 \qquad (3)$$

In order to oxidize substantial portions of nitrogen oxides to the pentavalent form in a limited reaction time available in the duct between the semi-dry scrubber and the bag house, an excess amount of ozone is required. A small amount of unreacted ozone is very likely to remain in the gas stream that enters the bag house. This residual amount of ozone causes loss of the mechanical strength of most commonly used fabric filters in the bag house. Residual ozone going out of the stack is also not recommended. In addition, metallurgy of ducts downstream of the scrubber, bag house and exhaust may also be adversely affected due to the presence of oxy acids of oxidized nitrogen oxides and residual ozone.

Since nitrogen oxides found in most combustion exhaust streams is in the form of NO which is almost non-reactive, NO is not removed in dry or semi-dry scrubbers. Therefore, for controlling nitrogen oxides emissions with dry and semi-dry scrubbers, the two major options are i) lowering nitrogen oxides formation at the source by modifying combustion and ii) treating nitrogen oxides in the exhaust gas stream using post combustion techniques.

The primary techniques used for reducing nitrogen oxides formation by modifying combustion are the use of a low nitrogen oxides burner (LNB), flue gas recirculation (FGR), staged combustion and over fire air (OFA). Often these techniques are not adequate and sometimes not suitable and post combustion techniques such as selective non-catalytic reduction (SNCR) and selective catalytic reduction (SCR) become necessary to attain mandatory nitrogen oxides reduction.

Both SNCR and SCR have good success in addressing nitrogen oxides problems but they also both have limitations. Ozone based oxidation technologies have recently gained success as post combustion technique especially when an application is not suitable for SCR where exhaust is treated in a wet scrubber. Ozone based processes are described in U.S. Pat. Nos. 5,206,002; 6,162,409; and 7,303,735 (of common assignment herewith) providing multi-pollutant removal approach and they have been implemented on flue gas arising from gas and coal fired boilers removing multiple pollutants including nitrogen oxides, sulfur oxide, particulates, etc. Ozone based processes are also industrially practiced in lower emissions in many applications, namely, metal pickling processes, fluidized catalytic cracker (FCC) regenerator processes, metal recovery furnaces and sulfuric acid manufacture. These successes for ozone based processes at commercial scale have been limited to wet scrubbing.

The present invention is able to overcome these limitations and provide effective methods for removing nitrogen oxides by oxidizing with ozone and removing in a semi-dry scrubber.

SUMMARY OF THE INVENTION

In one embodiment of the invention, there is disclosed a method for removing contaminants from a gas stream comprising the steps:

a) Feeding the gas stream containing contaminants into a dry or semi-dry scrubber;

b) Contacting the gas stream containing contaminants with a sorbent;

c) Injecting ozone into the dry or semi-dry scrubber downstream of the contact between the gas stream containing contaminants and the sorbent at a height or volume that represents a sufficient dry or semi-dry scrubber height or volume, thereby oxidizing the contaminants in the gas stream;

d) Contacting the oxidized contaminants with sorbent in remaining height or volume of the dry or semi-dry scrubber downstream of ozone injection; and e) Separating the sorbent from the gas stream exiting the dry or semi-dry scrubber.

In a different embodiment of the invention, there is disclosed a method for removing contaminants from a gas stream comprising the steps:

a) Feeding the contaminated gas stream containing contaminants into a dry or semi-dry scrubber;

b) Contacting the gas stream containing contaminants with a sorbent;

c) Injecting ozone into the dry or semi-dry scrubber downstream of the contact between the gas stream containing contaminants and the sorbent at a height or volume that represents a minimum of 15% scrubber height or volume, thereby oxidizing the contaminants in the gas stream;

d) Contacting the oxidized contaminants with sorbent in remaining height or volume of the dry or semi-dry scrubber downstream of ozone injection; and e) Separating the sorbent from the gas stream exiting the dry or semi-dry scrubber.

The exhaust gases that can be treated arise from boilers and engines using coal, fossil fuel, solid waste, biomass or heavy hydrocarbon feedstock, including metallurgical furnaces, cement, lime sintering and palletizing kilns. Typically the contaminants found in these exhaust gas are selected from the group consisting of nitrogen oxides, sulfur oxides, acid gases, particulates and heavy metals such as mercury.

The exhaust gases treated by the methods of the invention are typically those arising from the operation of a boiler, an engine, a metallurgical furnace, cement kiln, lime sintering kiln and a palletizing kiln.

The semi-dry scrubber for the removal of sulfur oxides and acid gases are of two types. The first type uses scrubbing of contaminants by large size sorbent aggregates being contacted in a very turbulent zone of the scrubber vessel. Contaminants come in contact with the large aggregates and are adsorbed on the surface. Lighter aggregates are those carried with the gas stream and are separated and recycled and may be partly purged. Rejuvenation of the aggregates is done in the scrubber vessel itself or in the aggregate recycle stream. Typically these are referred to as dry sorbent injector scrubbers.

The second type of semi-dry scrubber uses atomized or very small size aqueous spray of lime slurry in the scrubber vessel. It is often named as a spray dryer. Successful scrubbers have often atomized lime spray and exhaust gas flow in a co-current fashion. Typically these are referred to as spray dryer adsorber scrubbers.

In both types of semi-dry scrubbers, gas entering the scrubber is contacted with the most active form of the sorbent. Within the first 15 to 20% of the height or scrubber volume, 80 to 85% of the contaminants are removed on the sorbent. The gas stream is also significantly cooled either by the atomized spray of sorbent in the case of spray dryer scrubber or by rejuvenated aggregates. With a substantial amount of contaminants such as sulfur dioxide already removed in the first 15 to 20% of the height or volume of the scrubber, the removal efficiency of contaminants becomes less of an issue in the later volume of the scrubber.

The quantity of sorbent used or injected into the dry or semi dry scrubbing of acid gases and $SO_2$ is generally in significant excess of the amount theoretically required. Although using excess sorbent only provides marginal improvement in removal efficiency, the practice is often essential to meet stricter environmental emissions requirements.

Ozone is injected at a suitable height, preferably between 15 and 50% of the height or volume of the scrubber. At this height, the gas stream is in an ideal temperature range (165' to 220° F.; 74' to 104° C.) for nitrogen oxides oxidation to be fast enough and still preserve the pentavalent form from decomposing.

Semi-dry scrubbers are often operated in close range of dew point to improve efficiency. This will also provide adequate amounts of water vapor to convert $N_2O_5$ to $HNO_3$ per reaction (4) below:

$$N_2O_5 + H_2O \rightarrow 2HNO_3 \qquad (4)$$

The oxy acid, $HNO_3$ is very reactive form of nitrogen oxides. It immediately reacts with sorbent flowing along or suspended in the gas stream in the semi-dry scrubber. But $HNO_3$ is progressively formed in the semi-dry scrubber as the gas flows towards exit. Generally there is no additional sorbent required to capture oxidized NOx and oxyacid such as $HNO_3$. The excess portion of the sorbent remaining in the gas stream from the acid gas or $SO_2$ scrubbing is often enough. If required, the quantity of the sorbent injected in acid gases or $SO_2$ scrubbing may be increased to compensate for the quantity utilized in reacting oxidized NOx.

When the sorbent is lime slurry solids in the spray dryer type semi-dry scrubber, $HNO_3$ is transformed into the very stable compound $Ca(NO_3)_2$ on the solid surface of the sorbent as per reaction (5):

$$2HNO_3 + Ca(OH)_2 \rightarrow Ca(NO_3)_2 \qquad (5)$$

The volume of the semi-dry scrubber is generally large enough to ensure that aggregates or lime spray is completely dry before it enters the bag house. Having 50 to 85% of volume available for nitrogen oxides oxidation to the pentavalent form provides adequate reaction time for conversion to pentavalent form without requiring excess ozone for substantial nitrogen oxides removal. That also eliminates or reduces concerns about residual ozone attacking fabric filter and causing premature mechanical failure.

The temperature range for the ozone when it is injected into the dry or semi-dry scrubber is from 100° F. to 250° F. (37.7° C. to 121.1° C.).

The sorbents can typically be aqueous solution of lime, $Ca(OH)_2$, limestone, soda ash, caustic soda, soda bi Garb (sodium bi carbonate), Natrona, maglime (magnesium promoted lime) and other naturally occurring or synthetically derived carbonates, bicarbonates, hydroxides of alkali or alkaline earth metals and mixtures thereof.

The stoichiometric amount of ozone required is 1.5 moles of ozone per mole of nitrogen oxide (NO) and 0.5 moles of ozone per mole of nitrogen dioxide ($NO_2$) in the incoming gas stream containing contaminants for almost complete removal of nitrogen oxides.

The ozone will be added in an amount of stoichiometry or in a slight excess than the amount of nitrogen oxides present in the gas stream and will remain in contact with the gas stream for a time sufficient to allow oxidation of the nitrogen oxides to occur.

The ozone is injected into the dry or the semi-dry scrubber in a range of about 2% to about 12% by weight ozone in oxygen.

BRIEF DESCRIPTION OF THE DRAWINGS

The FIGURE is a schematic representation of a semi-dry scrubber retrofitted with ozone injection for nitrogen oxides control.

DETAILED DESCRIPTION OF THE INVENTION

Turning to the FIGURE, a semi-dry scrubber 4 is shown with ozone injection for the removal of nitrogen oxides and other contaminants.

The gas stream 1 such as a flue gas stream from an industrial process enters the semi-dry scrubber 4 at the bottom section and is contacted with in situ rejuvenated aggregates by lime slurry injection 2 into the throat of the scrubber 1. The smaller size or lighter aggregates are reintroduced into the scrubber 4 by recycle line 7.

Ozone is injected through line 3 at the height above the throat that represents at least 15% of the total scrubber height. The gas stream exiting the semi-dry scrubber 4 through line 5 has fine aggregates that are separated in the cyclonic separator 6.

The gas stream with fine dust from cyclonic separator 6 is then introduced through line 8 into particulate separator 9 which may be a bag house. The gas stream passes through the fabric filter for the desired level of particulate removal and is then exhausted to the atmosphere through line 10. The bottom hoppers in the bag house are periodically emptied, with the fine dust and particulate matter removed from the particulate separator 9 through line 11. Oversize aggregates that fail to suspend and remain in the throat falls to the bottom section of the semi-dry scrubber 4 and if required are removed as stream 12.

When operated thusly, the invention provides a 35% savings in ozone when compared to injecting the ozone upstream of the semi-dry scrubber where the flue gas temperature entering the semi-dry scrubber is 350° F. (176.6° C.).

The invention provides a cost effective option for the simultaneous removal of nitrogen oxides in a dry or semi-dry scrubber along with other contaminants. The operation of the invention does not produce nitrate containing liquid purge stream. Nitrate is embedded in the sorbents. The dry scrubber discharge solids will mainly consist of sorbents along with other particulate matter from the gas stream capture in a particulate capture device such as a bag house.

No additional capital process equipment is required by the methods of the present invention. There is limited corrosion concern and limited ozone slip due to the volume of the semi-dry scrubbers employed. Further there is minimum concern with fabric filter failure due to residual ozone.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what I claim is:

1. A method for removing contaminants from a gas stream comprising the steps:
    a) feeding the gas stream containing contaminants into a dry or semi-dry scrubber at a location near one end of the dry or semi-dry scrubber;
    b) contacting the gas stream containing contaminants with a sorbent;
    c) injecting ozone into the dry or semi-dry scrubber downstream of the contact between the gas stream containing contaminants and the sorbent, the ozone being injected at a location that is at least 15% of the total height of the dry or semi-dry scrubber above a lower end of the dry or semi-dry scrubber and higher than the location where the gas stream is fed to the dry or semi-dry scrubber, thereby oxidizing the contaminants in the gas stream;
    d) contacting the oxidized contaminants with sorbent in remaining height or volume of the scrubber downstream of ozone injection; and
    e) separating the sorbent from the gas stream exiting the dry or semi-dry scrubber.

2. The method as claimed in claim 1 wherein the sorbent is selected from the group consisting of aqueous solution of lime, $Ca(OH)_2$, limestone, soda ash; caustic soda, sodium bi carbonate, Natrona, magnesium promoted lime and naturally occurring or synthetically derived carbonates, bicarbonates, hydroxides of alkali or alkaline earth metals and mixtures thereof.

3. The method as claimed in claim 1 wherein the sorbent is more than one sorbent.

4. The method as claimed in claim 1 wherein the gas stream containing contaminants is an exhaust gas.

5. The method as claimed in claim 4 wherein the exhaust gas is from a device selected from the group consisting of a boiler, an engine, a metallurgical furnace, cement kiln, lime sintering kiln and palletizing kiln.

6. The method as claimed in claim 5 wherein the device is powered by a fuel selected from the group consisting of coal, fossil fuel, solid waste, biomass and heavy hydrocarbon feedstock.

7. The method as claimed in claim 1 wherein the contaminants are selected from the group consisting of nitrogen oxides, sulfur oxides, acid gases, particulates, and heavy metals.

8. The method as claimed in claim 1 wherein the dry scrubber is a dry sorbent injector scrubber.

9. The method as claimed in claim 1 wherein the semi-dry scrubber is a spray dryer adsorber scrubber.

10. The method as claimed in claim 1 wherein the contaminants oxidize in the remaining 80% to 85% height or volume of the dry or semi-dry scrubber.

11. The method as claimed in 10 wherein nitrogen oxides are oxidized to their pentavalent form in the remaining 80% to 85% height or volume of the dry or semi-dry scrubber.

12. The method as claimed in claim 1 wherein the ozone is added to the dry or semi-dry scrubber in an amount of greater stoichiometry than the amount of nitrogen oxides present in the gas stream containing contaminants.

13. The method as claimed in claim 12 wherein the ozone is fed in a stoichiometric ratio of 1.5 moles of ozone per mole of nitrogen oxide and 0.5 moles of ozone per mole of nitrogen dioxide in the gas stream containing contaminant.

14. The method as claimed in claim 1 wherein the ozone is injected into the dry or the semi-dry scrubber in a range of about 2% to about 12% by weight ozone in oxygen.

15. The method as claimed in claim 1 wherein the temperature range for the ozone when it is injected into the dry or semi-dry scrubber is from 37.7° C. to 121.1° C.

\* \* \* \* \*